Aug. 6, 1963   H. J. SOKOLOWSKI   3,100,018
TOOTHED HARROW ATTACHMENT
Filed Nov. 15, 1960   2 Sheets-Sheet 1
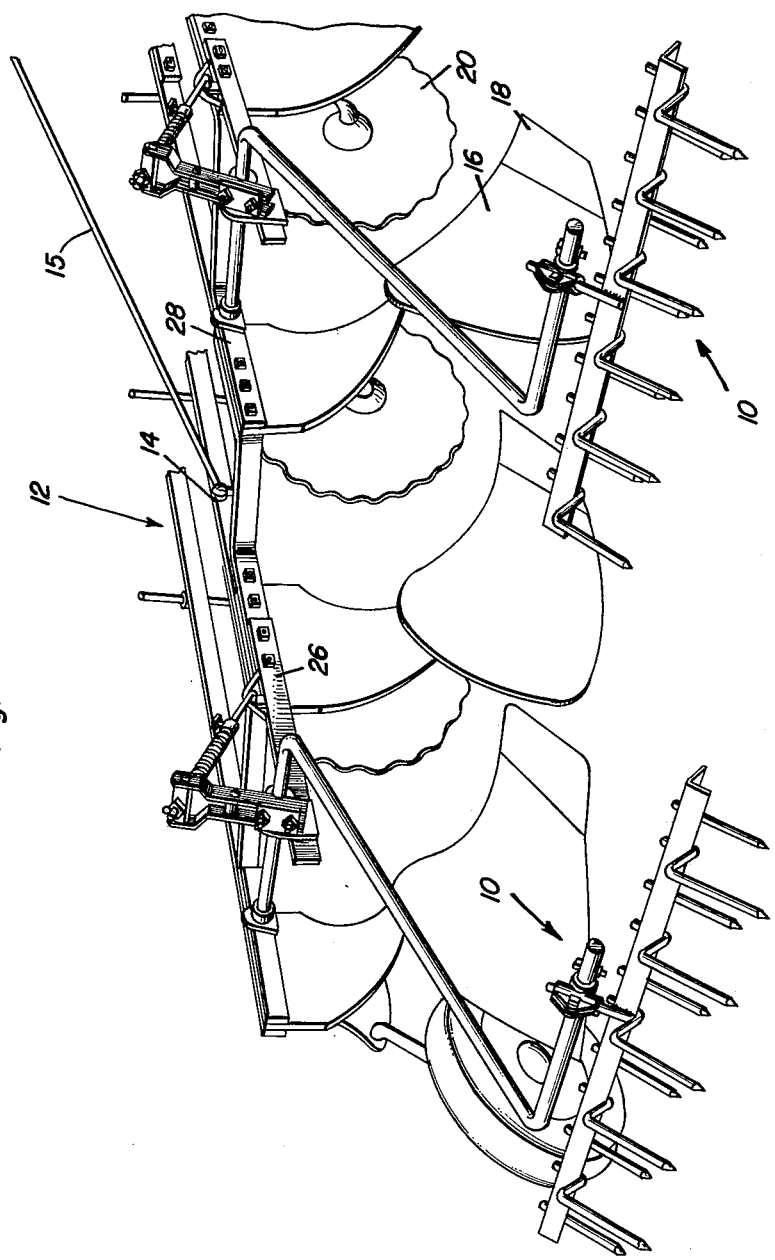
Henry J. Sokolowski
INVENTOR.

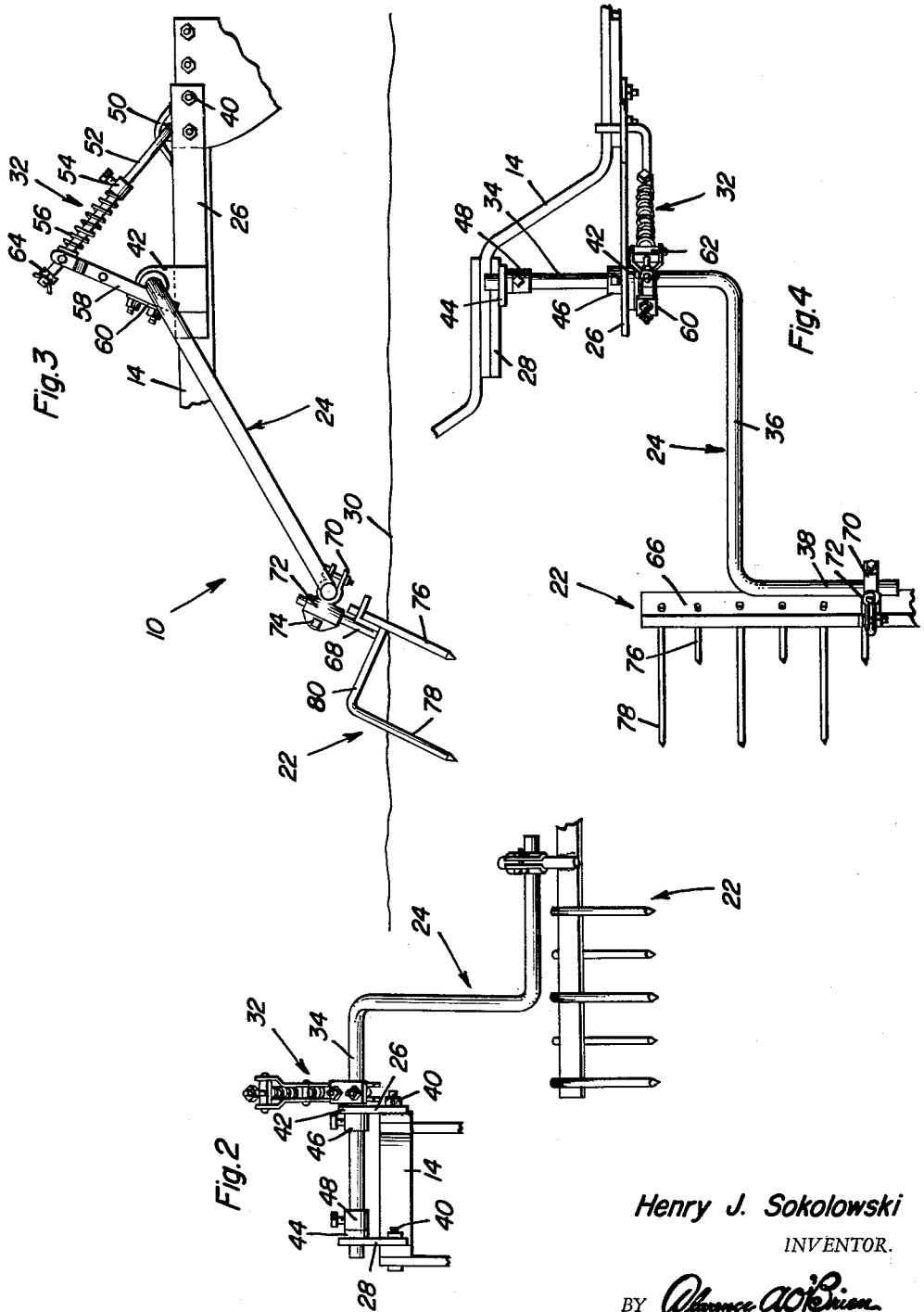

United States Patent Office 3,100,018
Patented Aug. 6, 1963

3,100,018
TOOTHED HARROW ATTACHMENT
Henry J. Sokolowski, R.F.D. 1, Pierson, Iowa
Filed Nov. 15, 1960, Ser. No. 69,499
7 Claims. (Cl. 172—160)

This invention relates to a novel harrow attachment especially useful as an attachment to the plow frame of various different types of tractor drawn plow implements.

A primary object of the invention is to provide a harrow attachment for a plow implement which will more effectively penetrate the soil and is more conveniently, efficiently and adjustably mountable on the plow frame than was heretofore possible with previous harrow attachments.

Another object of this invention is to provide a harrow attachment for a plow implement frame which is pivotally movable rearwardly of the plow shares into engagement with the earth with a pressure predetermined by adjustable spring mechanism which biases the harrow teeth for penetration of the soil at equal depth along points spaced rearwardly from the plowshare.

A further object of this invention is to provide a harrow attachment which pivotally mounts harrow teeth assemblies in laterally adjustable offset relation to the pivotal mounting for the harrow teeth assemblies for rearward alignment with the plowshares of the plow implement on which the attachment is mounted.

An additional and important object of this invention is to provide a harrow attachment which features harrow teeth assemblies having a set of laterally arranged straight teeth disposed at a rearward angle for penetration of the earth and a second rearwardly disposed set of bent teeth which are longer than the straight teeth so as to achieve equal depth penetration of the earth with the bent teeth being disposed in staggered relation to the straight teeth. As a result thereof more efficient and thorough results are obtained by use of the harrow attachment of this invention.

A still further object of this invention is to provide a harrow attachment which is yieldably biased into engagement with the earth by a novel spring mechanism operative in response to pivotal raising of the plow frame toward an inoperative position to also raise the harrow teeth assemblies out of contact so as to facilitate maneuvering of the tractor vehicle to which the plow frame and harrow attachment is connected.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a typical commercially available tractor drawn plow implement to which a pair of harrow attachments made in accordance with this invention are shown attached.

FIGURE 2 is a rear elevational view of a harrow attachment made in accordance with this invention.

FIGURE 3 is a side elevational view of the attachment illustrated in FIGURE 2.

FIGURE 4 is a top plan view of the harrow attachment illustrated in FIGURES 2 and 3.

Referring now to the drawings in detail, it will be observed from FIGURE 1 that a pair of harrow attachments generally referred to by reference numeral 10 are mounted on a multiple plow implement generally indicated by reference numeral 12 which includes a plow frame generally indicated by reference numeral 14 that is pivotally displaceable to an inoperative position by means of rod 15 which frame 14 mounts a plurality of moldboards 16 having plowshares 18 mounted thereon and rolling coulters 20 operative in connection with the plowshares in a manner well known to those skilled in the art. The invention of this application is concerned with the harrow attachment 10 which may be attached to the frame assembly 14 of the plow implement 12. It will of course be understood that the harrow attachment 10 may also be mounted on plow implements of different types other than that illustrated for examplary purposes in FIGURE 1. In all cases however, the harrow attachment 10 will trail behind the plowshares with which they are associated.

Referring now to FIGURES 2, 3 and 4 in particular, a single harrow attachment 10 is illustrated mounted on a portion of the plow frame 14. It will be observed therefore, that the harrow attachment comprises a harrow teeth assembly generally indicated by reference numerals 22 which is supported by a pivotal mounting member generally referred to by reference numeral 24 which is rotatably mounted on the frame 14 by means of a pair of spaced bracket members 26 and 28. The harrow teeth assembly 22 is therefore yieldingly biased into engagement with the earth 30 by means of a spring mechanism generally indicated by reference numeral 32 which is pivotally mounted on the bracket member 26 and operatively connected to the pivotal mounting member 24 for such purpose.

The pivotal mounting member 24 includes a shaft portion 34 through which the pivotal axis for the member 24 extends and is fixed with respect to the plow frame 14. Disposed at substantially right angles to the shaft portion 34 of the pivotal mounting member 24 is an elongated portion 36 which extends rearwardly and downwardly with respect to the shaft portion 34 and is connected at the rearward end thereof to a harrow assembly mounting portion 38 disposed perpendicular to the portion 36 in offset relation to the shaft portion 34.

In order to pivotally mount the shaft portion 34 of the pivotal mounting member 24 about a fixed pivotal axis with respect to the plow frame 14, the bracket members 26 and 28 are attached at laterally spaced points to the plow frame 14. Fasteners 40 are therefore provided for such purpose. Also, journal brackets 42 and 44 are respectively secured to the bracket members 26 and 28 as by welding in order to receive the shaft portion 34 for journaling thereof. Collar members 46 and 48 are accordingly fixed to the shaft portion 34 in order to maintain the shaft portion in assembled position between the journal brackets 42 and 44. It will therefore be observed that the shaft portion 34 extends laterally from one side of the spaced journal brackets by means of which the pivotal mounting member 24 is pivotally displaceable together with the harrow teeth assembly 22 mounted thereon.

Pivotal displacement of the pivotal mounting member 24 is however limited by means of the spring mechanism 32. It will therefore be observed that the bracket member 26 is provided with a pivot mounting 50 by means of which the rod member 52 is pivotally connected to the bracket member 26. Adjustably fixed to the rod member 52 is an abutment collar member 54 against which a spring element 56 disposed about the rod member 52 is seated. The upper end of the spring element 56 abuts against and biases a pair of interconnected arm members 58 which are suitably clamped to the shaft portion 34 for pivotal movement therewith. A clamp device generally indicated by reference numeral 60 is accordingly provided for securing the interconnected arm members 58 to the shaft portion 34. An apertured block member 62 is provided between the arm members 58 adjacent the upper ends thereof for receiving therethrough the rod member 52 of the spring mechanism 32. Accordingly, the rod member 52 is slidably movable with respect to the arm members 52 and limited in one direction of relative movement by the adjustable bias of the spring elements 56 and in the other direction by the limit nut 64. From the foregoing description, it will be apparent that the spring element 56 will impose a spring biasing force on the arm members 58 communicated to the pivotal mounting member 24 tending to pivotally displace the member 24 in a counterclockwise direction as viewed in FIGURE 3. Accordingly, the harrow teeth assembly 22 mounted at the lower end of the pivotal mounting member 24 will be biased into engagement with the earth 30. When, however, the plow frame 14 is in itself pivotally displaced upwardly in order to raise the plows mounted thereon out of ground contact, the weight of the harrow seat assembly 22 will cause further pivotal displacement of the pivotal mounting member 24 in a counterclockwise direction, until the upper end of the arm members 58 connected to the member 24 will abut against the limiting nut member 64 so that the harrow teeth assembly 22 will also be brought out of ground contact when the plow frame 14 is raised upwardly to a sufficient extent.

Referring now to the harrow teeth assembly 22 itself, it will be observed that the assembly 22 includes a tooth mounting member 66 made of angle iron which has welded thereto intermediate the ends thereof a mounting rod element 68. A clamp member 70 is clamped to the mounting portion 38 of the member 24, which clamp member includes a sleeve portion 72 within which the mounting rod element 68 is received and is adjustably secured therein by clamping fastener 74. The mounting member 66 may therefore be adjustably connected to the pivotal mounting member 24 in a vertical direction while it may be laterally adjustable with respect to the member 24 by clamping the clamp member 70 at any desired location on the mounting portion 38.

A plurality of straight teeth prongs 76 are secured to the angle mounting member 66 and project downwardly therefrom at an angle for soil penetration as indicated in FIGURE 3. The prongs 76 are laterally spaced along the mounting member 66 at any desired spacing. Also, connected to the mounting member 66 are a plurality of bent teeth prongs 78 which include a rearwardly projecting portion 80 to which the teeth 78 are connected so as to position the teeth 78 rearwardly of the teeth 76. It will also be observed that the teeth 78 are disposed on the member 66 in staggered relation to the teeth 76 and are longer in length than the teeth 76 so that the soil 30 will be penetrated by the teeth 78 to a depth equal to that of the teeth 76 despite rearward disposition of the teeth 78 with respect to the teeth 76. Accordingly, two sets of teeth 76 and 78 arranged substantially parallel to each other and parallel to the pivotal axis through the shaft portion 34 will engage and penetrate the earth in a more efficient and thorough manner.

From the foregoing, operation and a utility of the harrow attachment of the present invention will be apparent. It will therefore be appreciated that by virtue of the novel harrow teeth arrangement on the assembly 22 more thorough plowing of the soil by the harrow teeth may be achieved. Furthermore, by virtue of the novel mounting of the harrow teeth assembly an improvement in mounting and yielding variations of the harrow teeth attachment is achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a displaceable plow frame having a plow share mounted thereon, a harrow attachment comprising, spaced bracket means defining a rotational axis disposed above the frame and perpendicular to direction of movement of the frame, shaft means rotatably mounted by said spaced bracket means for limited angular displacement about said rotational axis in both directions, said shaft means including a portion projecting laterally of one of said spaced bracket means and depending rearward and downward from the frame, a harrow blade assembly, means adjustably connecting said assembly to a lower end of said portion of the shaft means in laterally adjustable rearwardly spaced relation to the plowshare, an arm fixed to said shaft means adjacent to said one bracket means projecting upwardly and forwardly thereof, lever means pivotally mounted on said one bracket means forwardly of the shaft means and operatively connected to said arm and resilient means mounted on said lever means for biasing the shaft means in one rotational direction for engaging the harrow blade assembly with the ground.

2. The combination of claim 1, including limit means mounted on said lever means engageable with the arm for limiting relative rotational displacement of the shaft means in the other rotational direction.

3. A harrow attachment for a plow frame comprising pivotal mounting means having a pivotal axis fixed with respect to the frame perpendicular to the direction of forward movement thereof, means pivotally mounted on the plow frame and operatively connected to the pivotal mounting means including means for yieldably limiting pivotal displacement of the mounting means in one direction about the pivotal axis and limit stop means to fixedly limit pivotal displacement in the other direction, and spaced harrow teeth means mounted on said pivotal mounting means and adjustable therealong parallel to said pivotal axis and operative in response to the bias of the yieldable limiting means to penetrate the earth to equal depths at points spaced rearwardly from the pivotal axis, said harrow teeth means comprising a plurality of straight teeth laterally spaced from each other substantially parallel to said pivotal axis, and a plurality of bent teeth projecting rearwardly from the straight teeth and disposed in staggered relation to the straight teeth along a line substantially parallel to the pivotal axis.

4. The combination of claim 3, wherein said bent teeth are longer than the straight teeth so as to penetrate the earth to a depth equal to the penetration by the straight teeth.

5. A harrow attachment for a plow frame comprising pivotal mounting means having a pivotal axis fixed with respect to the frame perpendicular to the direction of forward movement thereof, means pivotally mounted on the plow frame and operatively connected to the pivotal mounting means including means for yieldably limiting pivotal displacement of the mounting means in one direction about the pivotal axis and limit stop means to fixedly limit pivotal displacement in the other direction, and spaced harrow teeth means mounted on said pivotal mounting means and adjustable therealong parallel to said pivotal axis and operative in response to the bias of the yieldable limiting means to penetrate the earth to equal depths at points spaced rearwardly from the pivotal axis, said pivotal mounting means comprising, a pair of spaced bracket means attached to the plow frame, supporting shaft means rotatably mounted by the bracket means about said pivotal axis, said harrow teeth means being connected to the shaft means in adjustable offset relation thereto, and said means including the yieldable limiting means being movably mounted on one of said spaced bracket means.

6. A harrow attachment for a plow frame having a plow share mounted thereon comprising, a pair of spaced bracket means attached to the plow frame, supporting shaft means rotatably mounted by said spaced bracket means about an axis perpendicular to the direction of forward movement of the frame, harrow teeth assembly means operatively connected to said shaft means in adjustable offset relation thereto for engagement with the ground in rearward alignment with said plowshare, means operatively connected to the plow frame for displacement thereof to an inoperative position, yieldable means movably mounted on one of said spaced bracket means and operatively connected to said shaft means to adjustably bias the harrow teeth assembly into ground engagement and limit stop means responsive to pivotal displacement of the plow frame toward an inoperative position to retract the harrow teeth assembly from ground engagement, said harrow teeth assembly comprising a plurality of straight teeth laterally spaced from each other substantially parallel to said shaft means, and a plurality of bent teeth projecting rearwardly from the straight teeth and disposed in staggered relation to the straight teeth along a line substantially parallel to the shaft means.

7. The combination of claim 6, wherein said bent teeth are longer than the straight teeth so as to penetrate the earth to a depth equal to the penetration by the straight teeth.

References Cited in the file of this patent
UNITED STATES PATENTS

| | | |
|---|---|---|
| 705,233 | Hartell | July 22, 1902 |
| 910,162 | Barbee | Jan. 19, 1909 |
| 1,025,874 | Kirkhuff | May 7, 1912 |
| 1,596,838 | Houser | Aug. 17, 1926 |
| 1,941,306 | Hotto | Dec. 26, 1933 |
| 2,277,880 | Noble | Mar. 31, 1942 |
| 2,649,725 | Oehler et al. | Aug. 25, 1953 |
| 2,707,909 | Ampe | May 10, 1955 |
| 2,934,155 | McMaster | Apr. 26, 1960 |
| 2,940,531 | Schaap | June 14, 1960 |
| 2,960,169 | Collins | Nov. 15, 1960 |

FOREIGN PATENTS

| | | |
|---|---|---|
| 85,689 | Norway | Apr. 16, 1955 |